United States Patent [19]

Coustre

[11] Patent Number: 4,945,297

[45] Date of Patent: Jul. 31, 1990

[54] ELECTRONIC DEVICE FORMING A BIDIRECTIONAL INTERFACE FOR CONTROLLING A LOAD SWITCHING POWER ELEMENT

[75] Inventor: Andreé Coustre, Andresy, France

[73] Assignees: Automobiles Peugeot; Automobiles Citroen, both of France

[21] Appl. No.: 195,697

[22] Filed: May 18, 1988

[30] Foreign Application Priority Data

May 19, 1987 [FR] France ............................ 87 06993

[51] Int. Cl.$^5$ .......................................... G05B 23/02
[52] U.S. Cl. .................................... 318/558; 340/538; 340/825.16; 340/825.17; 340/825.54; 370/32
[58] Field of Search ............................. 318/341, 558; 340/825.06, 825.16, 825.17, 825.54, 538; 370/32, 32.1; 307/10 R, 10 LS, 10.8

[56] References Cited

U.S. PATENT DOCUMENTS

| | | | |
|---|---|---|---|
| 4,086,570 | 4/1978 | Wakasa et al. | 340/538 X |
| 4,644,320 | 2/1987 | Carr et al. | 340/538 X |
| 4,660,023 | 4/1987 | Thern et al. | 340/538 X |
| 4,667,187 | 5/1987 | Volk et al. | 307/10 LS X |
| 4,668,946 | 5/1987 | Volk et al. | 307/10 LS X |
| 4,675,560 | 6/1987 | Stroppiana | 307/10 LS X |
| 4,733,223 | 3/1988 | Gilbert | 340/825.54 X |
| 4,737,763 | 4/1988 | DeFino et al. | 307/10 LS X |
| 4,739,309 | 4/1988 | Bräuninger et al. | 340/538 X |
| 4,745,275 | 5/1988 | Osafune | 340/825.54 X |
| 4,777,468 | 10/1988 | Eustache et al. | 340/538 X |
| 4,812,821 | 3/1989 | Santy et al. | 340/538 X |

FOREIGN PATENT DOCUMENTS

| | | |
|---|---|---|
| 2749401 | 5/1979 | Fed. Rep. of Germany ............... 340/825.06 |
| 3149142 | 6/1983 | Fed. Rep. of Germany .... 307/10 R |
| 60-203054 | 10/1985 | Japan ....................... 340/825.17 |
| 2135799 | 9/1984 | United Kingdom . |
| 2159982 | 12/1985 | United Kingdom . |

*Primary Examiner*—Bentsu Ro
*Attorney, Agent, or Firm*—Steinberg & Raskin

[57] ABSTRACT

The invention relates to a bidirectional interface-forming electronic device comprising one logical circuit connected to an input/output of the central unit through a unique wire connection and permitting controlling the load and informing the central unit of the condition of the load through the wire connection.

9 Claims, 1 Drawing Sheet

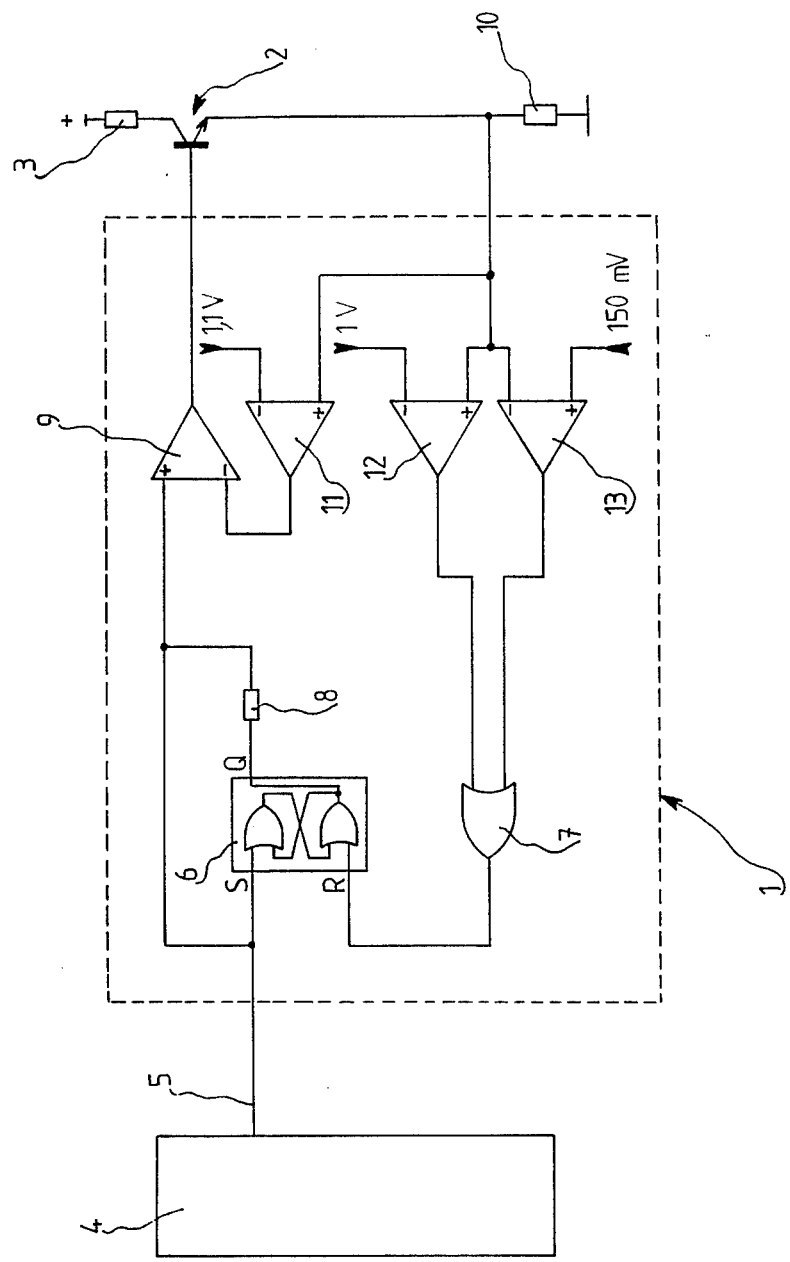

ELECTRONIC DEVICE FORMING A BIDIRECTIONAL INTERFACE FOR CONTROLLING A LOAD SWITCHING POWER ELEMENT

BACKGROUND OF THE INVENTION

This invention relates to an electronic device forming a bidirectional interface for controlling a load switching power element, the load being for example a filament lamp, a solenoid valve, or a motor.

Such electronic devices are known which are mounted in particular on automotive vehicles and which are connected to inputs/outputs of a central unit formed for example of a microprocessor to control the power element and to indicate and diagnose faulty operations of the outer elements each formed of the load.

However, these known devices necessitate a connection with the central treatment unit to transport the power element control signal and another different connection to transmit to the central unit the information signal relative to a faulty operation in particular of the load. In the case where several power elements are to be controlled, it is necessary to use a great corresponding number of inputs/outputs of the microprocessor and thus to increase the size of same. It is possible to reduce the number of connections related to the transmission of the faulty operation information signals by grouping these signals. However, as a result of this grouping, the defective elements cannot be distinguished from one another unless an additional bidirectional circuit is used.

The design of the known systems makes it therefore necessary to use either a greater number of inputs/outputs of the microprocessor, or an additional integrated circuit, resulting in a substantial cost increase.

SUMMARY OF THE INVENTION

The present invention has as an object to eliminate the above drawbacks by providing an interface-forming electronic device permitting an important reduction of the number of inputs/outputs of the microprocessor while controlling each load, diagnosing the state thereof and protecting also the power element by automatically limiting the current flowing through it.

For this purpose, the bidirectional or interface-forming electronic device of the invention is characterized in that it comprises one logical circuit connected to an input/output of the central unit through a unique wire connection making it possible to control the load and to inform the central unit of the condition of the load through the wire connection.

According to a feature of the invention, the logical circuit is a bistable circuit, one control input of which is connected to the wire connection and which memorizes at its output the control signal for controlling the conductive condition of the power element, which comes from the central unit in the output mode, the output signal of the bistable circuit being applied back to the control input of the bistable circuit to inform the central unit in the input mode of the normal operation of the load.

According to another feature of the invention, the device comprises further a circuit for monitoring the load operating conditions producing at another control input of the bistable circuit a signal which makes the condition of the bistable circuit output change when a faulty operation of the load is detected by the monitoring circuit.

According to still another feature of the invention, the device comprises further a circuit for automatically limiting the current inside the power element and comprising a differential amplifier of which one input is connected to the wire connection and a comparator whose output is connected to the other input of the differential amplifier and comparing at its two inputs the value of the current flowing through the power element with a higher reference value.

BRIEF DESCRIPTION OF THE DRAWING

For a fuller understanding of the invention, reference is made to the following description taken in conjunction with the accompanying drawing, in which the figure is a schematic representation of a bidirectional interface-forming device of the invention.

DETAILED DESCRIPTION OF THE PREFERRED EMBODIMENT

Referring to the Figure, the reference sign 1 designates the electronic device forming the bidirectional interface for controlling a power element 2 which is formed in the present case of a power transistor to switch or put into service a load 3 such for example as a filament lamp, a solenoid valve or a motor.

The interface-forming device 1 is connected to an input/output terminal of a control and treatment central unit 4, formed or a microprocessor, through a unique line or wire connection 5 along which the signals for controlling the transistor 2 as well as the signals providing information about the condition of the load 3 are transmitted, as will be explained later.

The interface-forming device 1 comprises one RS-type bistable circuit 6, whose control input S is connected to line 5 and whose control input R is connected to the output of a logical OR gate 7. The output Q of the bistable circuit 6 is also connected through a resistor 8 to the positive input of a differential amplifier 9, whose output is connected to the base of the power transistor 2. The output Q of the bistable circuit 6 is also connected to the control input S through resistor 8. The emitter of the power transistor 2 is grounded through a resistor 10 whereas the collector is connected to the load 3. A common junction between the emitter of transistor 2 and resistor 10 is connected to the positive input of a comparator 11, whose negative input receives a reference voltage, for example of 1.1 volts. The output of comparator 11 is connected to the negative input of differential amplifier 9. The common junction between the emitter of transistor 2 and resistor 10 is connected also to the positive and negative terminals respectively of two other comparators 12 and 13, of which both outputs are connected respectively to both inputs of the OR gate 7. The negative terminal of comparator 12 receives a higher reference voltage, for example of 1 volt, whereas the positive terminal of comparator 13 receives a lower reference voltage, for example of 150 millivolts.

The microprocessor central unit 4 is programmed in such a way that it defines on the wire line 5, three logical conditions, i.e. one logical condition "1" making the power transistor 2 conductive, one logical condition "0" blocking transistor 2 and one logical condition "Z", a high impedance condition of central unit 4, which permits reproducing the condition of load 3 and sending back along line 5 a logical level "1" indicating a correct or normal operation of the load, while memorizing the putting into conductive condition, or a logical level "0" indicating a faulty operation of the load (e.g. in open circuit or in short circuit), while making the power transistor 2 non-conductive.

The operation of the interface-forming device 1 of the invention readily follows already from the above description thereof and will now be explained.

When the assembly shown in the Figure is switched on, provided that there is no voltage at the negative input of comparator 13, the latter produces at its output a high level signal applied to the input R of bistable circuit 6 through the OR gate 7. The output Q of bistable circuit 6 is therefore in a low or "0" condition. When switched into the output mode, the central unit 4 delivers a logical condition signal "1" to the control input S of bistable circuit 6 and to the positive input of differential amplifier 9, whose output controls the conductive condition of power transistor 2, which consequently brings the load 3 into operation. Therefore, a current flows in the path collector-emitter of transistor 2 and the voltage appearing at the negative input of comparator 13 exceeds the lower reference voltage so that the output of comparator 13 reaches a lower level. The control input R reaches therefore the level "0". As the bistable circuit receives at its input S a "1" level signal, its output Q reaches this condition "1", which condition is memorized as known for this type of bistable circuit. Under the normal operating conditions, the voltage produced at the common junction between the emitter of transistor 2 and resistor 10 is between the upper and lower reference voltages of comparators 12 and 13 so that the condition of bistable circuit 6 remains unchanged, in particular its output Q is maintained at the high level for making power transistor 2 conductive and therefore for bringing load 3 into operation. Therefore, when the central unit 4 reaches the high impedance condition, it receives a high level signal at its input/output terminal connected to line 5, which signal informs it of a normal or correct operation of load 3. If the load 3 is to be taken out of operation, the central unit 4 emits along line 5 a low level control signal, which is the reciprocal of the high level control signal, and which blocks the power transistor 2.

The monitoring circuit formed of both comparators 12 and 13 permits detecting any faulty operation of the load 3.

Thus, in casee of a short-circuit in load 3, the voltagre produced at the common junction of the emitter of transistor 2 and of resistor 10 will exceed the upper reference voltage of comparator 12 thus making it produce at its output a high level signal which is applied to the priority input R of bistable circuit 6 through gate 7. The output Q of bistable circuit 6 will then reach a low level condition "0", which condition can be checked by the central unit 4 in the input mode. Of course, this condition change of the output Q of bistable circuit 6 blocks the power transistor 2.

In the case where a load 3 is in open circuit, the voltage at the common junction between the emitter of transistor 2 and resistor 10 becomes lower than the reference voltage of comparator 13 which delivers at its output a high level signal causing the output Q of bistable circuit 6 to pass from the high condition to the low condition, the latter being then checked by central unit 4 in the input mode. As previously, transistor 2 is then blocked by this change of condition.

The comparators 12 and 13 permit therefore monitoring the value of the rated operational current of the load and making the condition of the output of bistable circuit 6 change when the value of the current in the load is lower or higher than a predetermined reference value in case of a faulty operation of the load.

The differential amplifier 9 permits controlling the power transistor 2 by receiving the high level signal coming from central unit 4 and from the output Q of bistable circuit 6 on the one hand and the output signal of comparator 11 on the other hand, while limiting the current inside the power transistor 2 to such a value that the voltage at the common junction of the emitter of transistor 2 and of resistor 10 does not exceed the reference voltage of comparator 11. It is to be noted that, for a satisfactory operation of the monitoring of comparators 12 and 13, the reference voltage applied to comparator 11 should be slightly higher than the upper reference voltage applied to comparator 12.

When a filament lamp is to be put into operation as a load, the central unit 4 should send along line 5 a high level control impulse of a sufficient duration to exceed the reset zone of bistable circuit 6 provoked by the lamp switching peak currently likely to exceed the upper reference voltage of comparator 12, this control impulse duration naturally being in relation with the type of lamp used.

When the load is of the inductive type, as is the case in particular for a solenoid valve, the duration of the control impulse produced by the central unit 4 along line 5 should be greater than the time necessary for the current flowing through the solenoid valve to exceed the corresponding minimum reference voltage of comparator 13 in order to avoid a reset of bistable circuit 6 by its input R before the normal operation conditions are attained.

The interface-forming device of the invention permits therefore optimizing the central unit by substantially reducing the number of inputs/outputs since each device is connected to an input/output terminal of the central unit through a unique wire connection transporting the signals for controlling a load and the information signals of the condition of the load and by a simplified monitoring of the control (impulse control) and of the operation safety (automatic limitation of the current and automatic switching off in case of defect).

Although the circuits 9, 11-13 have been realized by using operational amplifiers, discrete component-based circuits for example may also be used to accomplish the same functions of amplification and of comparison without departing from the scope of the present invention.

What is claimed is:

1. A bidirectional interface-forming electronic device for controlling a power element for switching a load from a central control unit, comprising
one logical circuit connected to an input/output of the central control unit through a unique wire connection and a ground connection to control the power element for switching or disabling the load and to inform the central control unit of the condition of the load through the wire connection wherein said logical circuit is a bistable circuit, one control input of which is connected to the wire connection and which memorized at its output signal for controlling the conductive condition of the power element, which comes from the central control unit in an output mode, the output signal of the bistable circuit being applied back to the control input of the bistable circuit to inform the central control unit in an input mode of the normal operation of the load.

2. A device according to claim 1, further comprising a circuit for automatically limiting the current inside the power element and comprising a differential amplifier of which one input is connected to the wire connection and a comparator whose output is connected to the other input of the differential amplifier and comparing at its two inputs the value of the current flowing through the power element with a higher reference value.

3. A bidirectrional interface-forming electronic device for controlling a power element for switching a load from a central control unit, comprising one logical circuit connected to an input/output of the central control unit through a unique wire connection and a ground connection to control the power element for switching or disabling the load and to inform the central control unit of the condition of the load through the wire connection, and wherein said logical circuit is a bistable circuit, one control input of which is connected to the wire connection and which memorized at its output the signal for controlling the conductive condition of the power element, which comes from the central control unit in an output mode, as the output signal of the bistable circuit being applied back to the control input of the bistable circuit to inform the central control unit in an input mode of the normal operation of the load.

4. A device according to claim 3 further comprising a circuit for monitoring the load operating conditions producing at another control input of said bistable circuit a monitoring signal which makes the condition of the bistable circuit output change when a faulty operation of the load is detected by the monitoring circuit.

5. A device according to claim 4, wherein said monitoring circuit comprises a first comparator comparing the value of the current flowing through the load to an upper reference value and delivering said monitoring signal making the condition of the bistable circuit output change when the value of the current in the load is higher than the upper reference value.

6. A device according to claim 5, wherein said monitoring circuit comprises a second comparator comparing the value of the current flowing through the load to a lower reference value and delivering said monitoring signal making the condition of the bistable circuit output change when the value of the current in the load is lower than the lower reference value.

7. A device according to cliam 6, wherein the outputs of the first and second comparators are connected to the control input of the bistable circuit through a logical OR gate.

8. A device according to claim 7, wherein said bistable circuit is of the R-S type of which the outputs R and S are connected respectively to the output of said OR gate and to the wire connection.

9. A bidirectional interface-forming electronic device for controlling a power element for switching a load from a central control unit, comprising one logical circuit connected to an input/output of the central control unit through a unique wire connection and a ground connection to control the power element for switching or disabling the load and to inform the central control unit of the condition of the load through the wire connection, wherein said logical circuit is a bistable circuit, one control input of which is connected to the wire connection and which memorized at its output the signal for controlling the conductive condition of the power element, which comes from the central control unit in an output mode, the output signal of the bistable circuit being applied back to the control input of the bistable circuit to inform the central control unit in an input mode of the normal operation of the load, and further comprising a circuit for monitoring the load operating conditions producing at another control input of said bistable a signal which makes the condition of the bistable circuit output change when a faulty operation of the load is detected by the monitoring circuit.

* * * * *

UNITED STATES PATENT AND TRADEMARK OFFICE
CERTIFICATE OF CORRECTION

PATENT NO. : 4,945,297

DATED : July 31, 1990

INVENTOR(S) : André COUSTRE

It is certified that error appears in the above—identified patent and that said Letters Patent is hereby corrected as shown below:

ON THE TITLE PAGE

Item [75] Inventor: should read --André COUSTRE, Andresy, France--.

Signed and Sealed this

Third Day of March, 1992

Attest:

HARRY F. MANBECK, JR.

Attesting Officer

Commissioner of Patents and Trademarks